United States Patent
Li et al.

(10) Patent No.: US 8,760,530 B2
(45) Date of Patent: Jun. 24, 2014

(54) IMAGE CAPTURING APPARATUS, IMAGE CAPTURING METHOD AND ELECTRONIC APPARATUS

(75) Inventors: Yun-Chin Li, New Taipei (TW); Yu-Ming Cheng, Hsinchu (TW); Chin-Lung Yang, Toufen Township (TW)

(73) Assignee: Altek Corporation, Hsinchu (TW)

( * ) Notice: Subject to any disclaimer, the term of this patent is extended or adjusted under 35 U.S.C. 154(b) by 599 days.

(21) Appl. No.: 13/084,183

(22) Filed: Apr. 11, 2011

(65) Prior Publication Data

US 2012/0120284 A1 May 17, 2012

(30) Foreign Application Priority Data

Nov. 16, 2010 (TW) .................. 99139366 A

(51) Int. Cl.
*H04N 5/235* (2006.01)
*H04N 5/225* (2006.01)

(52) U.S. Cl.
USPC .................. 348/222.1; 348/218.1

(58) Field of Classification Search
USPC .......................... 348/222.1, 218.1
See application file for complete search history.

(56) References Cited

U.S. PATENT DOCUMENTS

2007/0236561 A1* 10/2007 Anai et al. .............. 348/46
2009/0160995 A1* 6/2009 Kohama .............. 348/333.02

* cited by examiner

*Primary Examiner* — Joel Fosselman
(74) *Attorney, Agent, or Firm* — Wang Law Firm, Inc.; Li K. Wang; Stephen Hsu

(57) ABSTRACT

The present invention discloses an electronic apparatus, an image capturing apparatus and a method thereof. The image capturing method comprises the steps of: capturing a plurality of temporal images by an image capturing module; setting one of the temporal images as a base image by a processing module; determining whether the difference between the temporal images and the base image is over a predetermined range by the processing module; if yes, deleting the temporal image by the processing module; combining the else temporal images and the base image and correspondingly generating an output image.

8 Claims, 6 Drawing Sheets

IMAGE CAPTURING APPARATUS, IMAGE CAPTURING METHOD AND ELECTRONIC APPARATUS

BACKGROUND OF THE INVENTION

1. Field of the Invention

The present invention relates to an electronic apparatus, an image capturing apparatus and a method thereof, and more particularly to an electronic apparatus, an image capturing apparatus and a method thereof, having a mechanism of filtering image for image combination in order to reduce noises and output a clear image.

2. Description of the Related Art

While operating digital camera to take pictures, blurred images are easily caused by a user's hand vibration due to the light weight and small size of digital camera. When a conventional digital camera is operated, users may shake the camera by an accident or by an incorrect posture of holding the digital camera. As the digital camera is designed with a smaller volume and a lighter weight, the possibility of having hand vibrations becomes higher and higher, particularly when users press the shutter of a compact camera. The level of hand vibrations will affect the quality of the photos taken, and the angle of the images and the resulted photo may be deviated in a minor case, and blurred images may be resulted in a severe case. Obviously, the hand vibration is one of the major issues that require feasible solutions.

There are various different vibration reduction mechanisms, including the use of moving the lens to compensate the vibration of the camera, the control of aperture values and shutter speeds to reduce the hand vibrations, and the use of software to perform a signal processing to the captured images in hope of resuming the clarity of the images. The aforementioned optical vibration reduction mechanism moves a lens or an image sensor horizontally or vertically to correct the tilt caused by the hand vibrations, but such reverse correction usually generates blurred images when there is no hand vibration. The digital vibration reduction mechanism also generates blurred images due to the correction of the vibrations by means of related algorithms and image processing methods.

As to the digital vibration reduction mechanism, a multiple exposure is usually used to reduce noises in order to take a clear and low-noise image under the conditions of a low ambient illumination and a severe hand vibration. If it is necessary to obtain a high-quality output image, each image must be corrected geometrically, so that each image can be combined point by point precisely, and then an image processing technique is used to remove and process the noises after the images are corrected geometrically, so as to generate the low-noise and clear images. However, the present multiple exposure techniques used extensively in cameras mostly focus on the processing of all images of the photos taken but without a filter mechanism to eliminate an inappropriate image. As a result, the quality of the captured images is inconsistent, and both of the good and bad images are processed in the noise removal process, and erroneous images may be processed in the same manner as good images, and the quality of the output images will be low. Sometimes, the quality of the output images is even lower than that of taking the photo by a single exposure technique.

SUMMARY OF THE INVENTION

Therefore, it is a primary objective of the present invention to overcome the aforementioned shortcomings of the prior art including the inconsistence and the low quality of the output images by providing an electronic apparatus, an image capturing apparatus and a method thereof.

To achieve the foregoing objective, the present invention provides an image capturing apparatus, comprising an image capturing module and a processing module. The image capturing module is provided capable of capturing a plurality of temporal images. The processing module is provided capable of setting one of the temporal images as a base image, and the processing module further determines whether or not the difference between each temporal image and the corresponding base image is greater than a threshold value. The processing module deletes the temporal image and performs an image combination of the remaining temporal images with the base image to generate an output image if the difference between one of the temporal images and the base image is greater than the threshold value.

The processing module performs a geometric alignment of the base image with each temporal image and correspondingly calculates a first error value, such that the processing module deletes this temporal image if the first error value is greater than the first threshold value.

The processing module uses a histogram of the base image and each temporal image to determine whether or not a second error value between each temporal image and the base image is greater than a second threshold value, such that the processing module deletes this temporal image if the second error value is greater than the second threshold value.

After the image combination is executed, the processing module further compensates the brightness of an output image by a digital gain or a temporal interpolation.

When the temporal image is deleted, the processing module increases the brightness of the base image and beautifies the base image to generate the output image.

To achieve the foregoing objective, the present invention further provides an image capturing method, comprising the steps of: capturing a plurality of temporal images by an image capturing module; setting one of the temporal images as a base image by a processing module; determining whether the difference between the temporal images and the base image is greater than a threshold value by the processing module; if yes, deleting the temporal image by the processing module; combining the remaining temporal images and the base image; and correspondingly generating an output image.

The image capturing method further comprises the steps of: performing a geometric alignment of the base image with each temporal image by the processing module, correspondingly computing a first error value, and determining whether or not each first error value is greater than a first threshold value by the processing module. If the first error value is greater than the first threshold value, the processing module will delete this temporal image.

The image capturing method further comprises the step of: using a histogram of the base image and each temporal image to determine whether or not a second error value of each temporal image and the base image is greater than a second threshold value by the processing module. If the second error value is greater than the second threshold value, the processing module will delete this temporal image.

The image capturing method further comprises the step of: compensating the brightness of an output image by a digital gain or a temporal interpolation after the processing module performs an image combination.

The image capturing method further comprises the steps of: increasing the brightness of the base image by the processing module when the pluralities of temporal images are deleted, and then beautifying the base image to generate the output image by the processing module.

To achieve the foregoing objective of the present invention, the present invention further provides an electronic apparatus comprising a main body and the aforementioned image capturing apparatus, and the image capturing apparatus is installed in the main body.

The electronic apparatus is a digital camera, a mobile phone with a photographic function, a personal digital assistant (PDA) with a photographic function or a tablet personal computer with a photographic function.

The electronic apparatus and the image capturing apparatus of the present invention and the method thereof have one or more of the following advantages:

(1) In the electronic apparatus and the image capturing apparatus of the present invention, and the method thereof, a geometric alignment is performed to a plurality of temporal images, and the temporal image with a poor quality is filtered according to an alignment error to improve the clarity of the output image produced after the image combination.

(2) In the electronic apparatus and the image capturing apparatus of the present invention and the method thereof, the electronic apparatus, image capturing apparatus and method thereof can analyze the histogram of each temporal image, and filter the temporal image with a poor quality according to the error to improve the clarity of the output image produced after the image combination.

DETAILED DESCRIPTION OF THE PREFERRED EMBODIMENTS

The foregoing and other objectives, characteristics and advantages of the present invention will become apparent by the detailed description of a preferred embodiment as follows.

Figure 1:
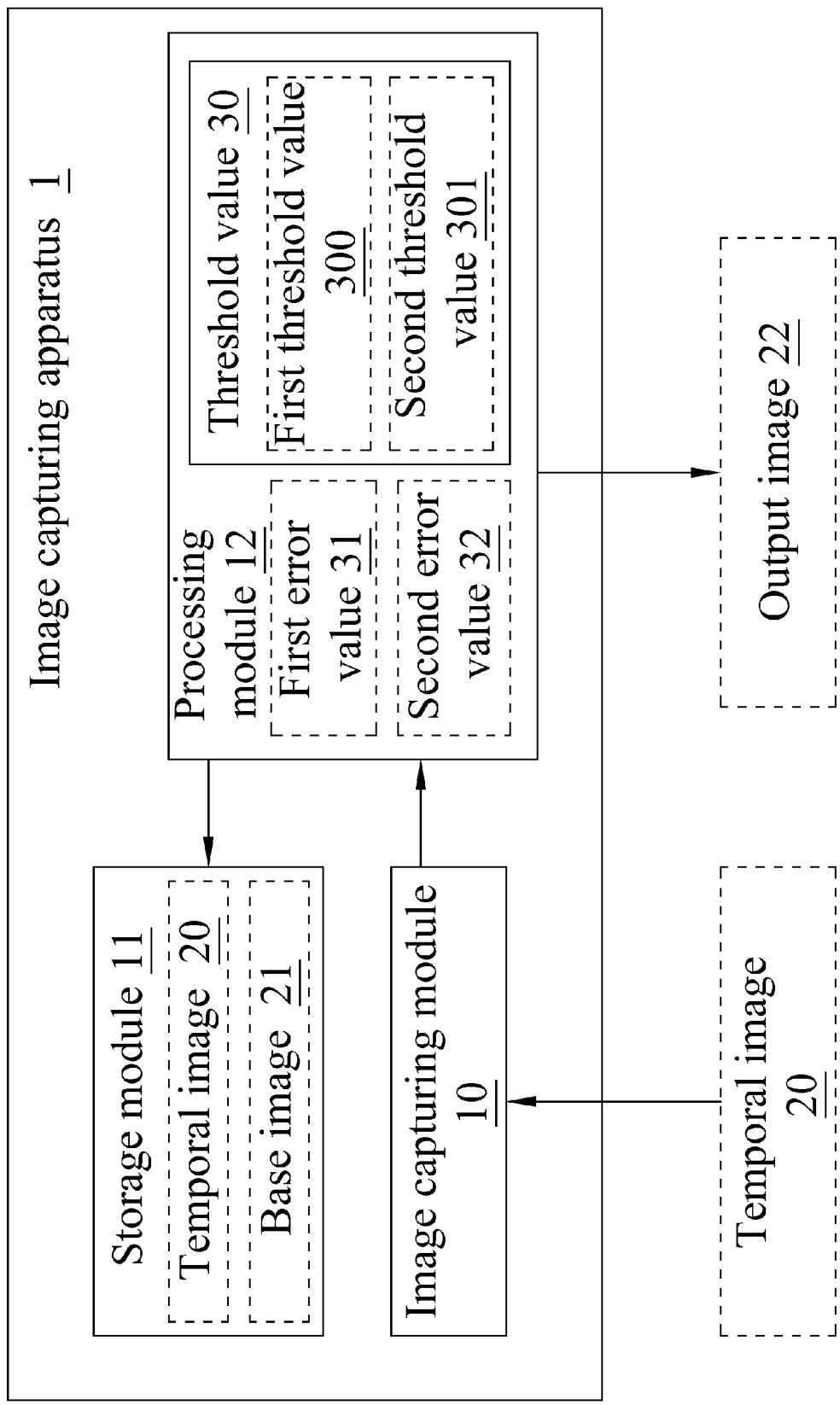
FIG. 1 is a block diagram of an image capturing apparatus of the present invention.

With reference to FIG. 1 for a block diagram of an image capturing apparatus of the present invention, the image capturing apparatus 1 comprises an image capturing module 10, a storage module 11 and a processing module 12. The image capturing module 10 comprises at least a light sensing element such as a complementary metal oxide semiconductor (CMOS) or a charge coupled device (CCD), a lens and a lens module. The storage module 11 can be an embedded memory, an external memory card or a combination of both. The processing module 12 is electrically coupled to the image capturing module 10 and the storage module 11, and the processing module 12 is a central processing unit (CPU) or a micro processing unit (MPU). In a preferred embodiment of the present invention, the image capturing apparatus 1 can be a digital camera or a digital video camera.

The image capturing module 10 is provided capable of capturing a plurality of temporal images 20 and storing the temporal images 20 into the storage module 11. The processing module 12 sets one of the temporal images 20 as a base image 21, and determines whether or not the difference between the temporal image 20 and the base image 21 is greater than a threshold value 30. The processing module 12 deletes the temporal image 20 and performs an image combination of the remaining temporal images 20 with the base image 21 to correspondingly generate an output image 22 if the difference between the temporal image 20 and the base image 21 is greater than a threshold value 30. The threshold value 30 comprises a first threshold value 300 and a second threshold value 301.

In some preferred embodiments, the processing module 12 further performs a geometric alignment of each base image 21 with each temporal image 20 and calculates a first error value 31. If the first error value 31 is greater than the first threshold value 300, the processing module 12 will delete the temporal image 20. In another preferred embodiment, the processing module 12 further uses a histogram of the base image 21 and each temporal image 20 to determine whether or not a second error value 32 between each temporal image 20 and base image 21 is greater than the second threshold value 301. The processing module 12 deletes the temporal image 20 if the second error value 32 is greater than the second threshold value 301. After an image combination of the temporal images 20 with the base image 21 to generate the output image 22 is executed, the processing module 12 further compensates the brightness of the output image 22 by a digital gain or a temporal interpolation.

In certain conditions, if the quality of the temporal images captured by the image capturing module 10 is poor, the temporal image 20 will be deleted. And then, the processing module 12 will increase the brightness of the base image 21 and beautify the base image 21 to generate the output image 22. In this preferred embodiment, the output image 22 is preferably stored as a file in the storage module 11, and the temporal image 20 is preferably stored as data in the storage module 11. In addition, the output image 22 is preferably available for the viewing by users, but the temporal image 20 is preferably unavailable for the viewing by users.

Figure 2:
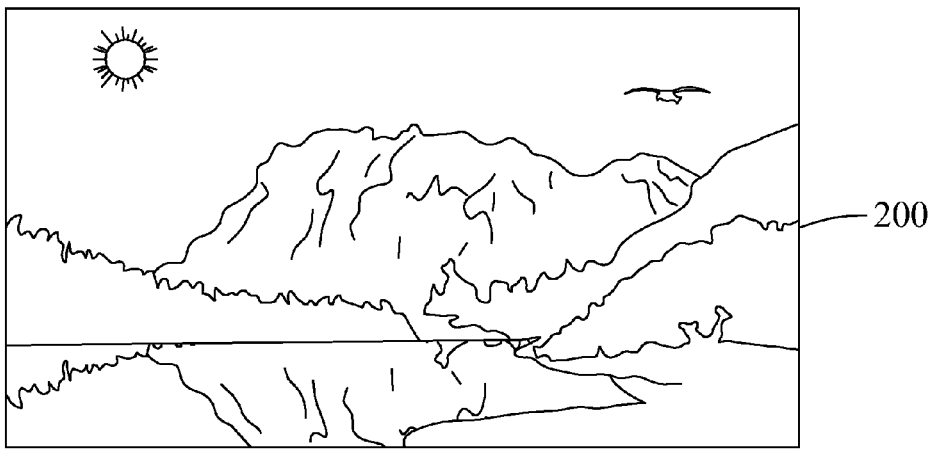
FIG. 2 is a schematic view of an image capturing apparatus in accordance with a first preferred embodiment of the present invention.
Figure 2:
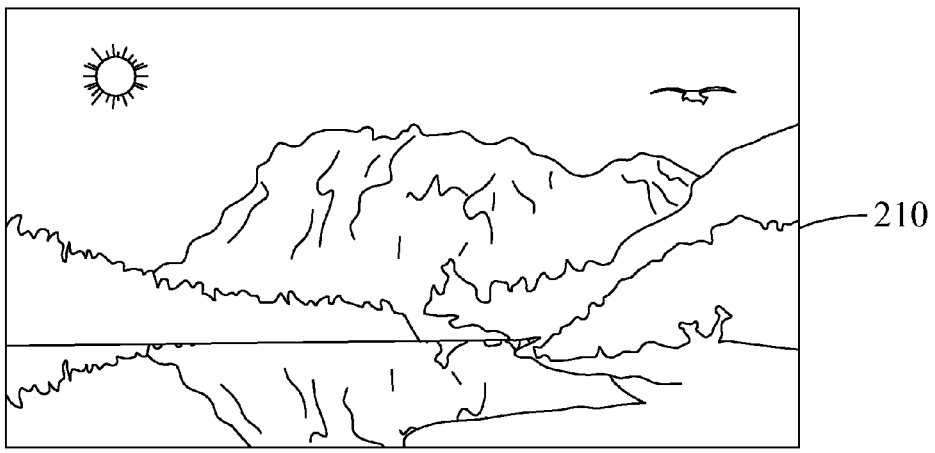
Figure 2:
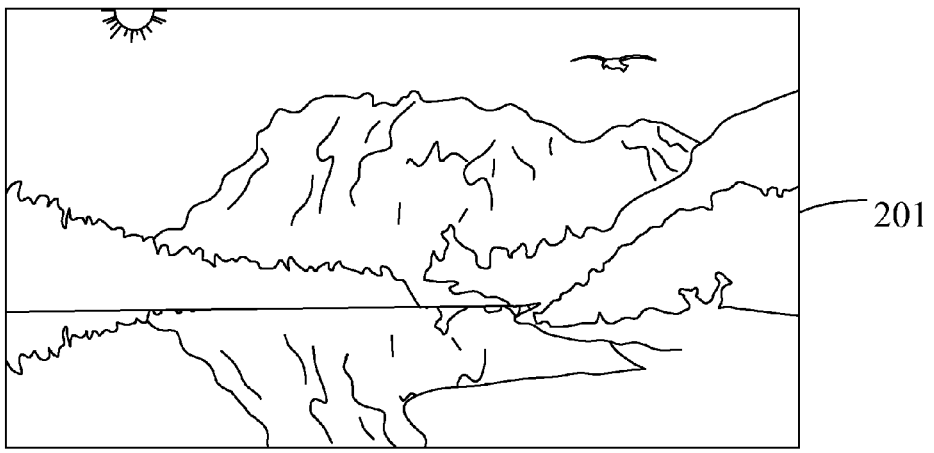

With reference to FIG. 2 for a schematic view of an image capturing apparatus in accordance with a first preferred embodiment of the present invention, the image capturing module 10 captures three consecutive temporal images, and the processing module 12 or a user selects one of the temporal images as a base image 210, so that the remaining two images are temporal images 200, 201 used for geometrically aligning with the base image 21. In FIG. 2, the content of the temporal image 201 has a much larger geometric difference than the base image 210, and such geometric difference may result in an image displacement caused by hand vibrations, or noises caused by a low ambient illumination, so that a good alignment cannot be achieved in the geometric alignment process. In this preferred embodiment, the temporal image 201 is generated after the camera is displaced vertically downward by a user's hand vibration, and thus half of the sun at the top of the photo is cut off, and additional parts of images of the lake at the bottom of the photo are captured. In the process of performing the geometric alignment, the processing module 12 calculates the geometric transformation parameters for each of the temporal images 200, 201 when they are aligned with the base image 210, and the processing module 12 further generates a first error value 31 based on each of the geometric transformation parameters, and compares the first error value 31 with the first threshold value 300. If there is a big difference between the two, the alignment cannot be made precisely, and the error is too large. If the first error value 31 exceeds the first threshold value 300, the processing module 12 determines that the geometric difference between the temporal image 201 and the base image 210 is relatively large and the temporal image 201 and the base image 210 are inapplicable for the following image combination procedure, so that the processing module 12 deletes the temporal image 201 in the storage module 11 and perform an image combination of the remaining temporal images 200 with the base image 210.

Figure 3:
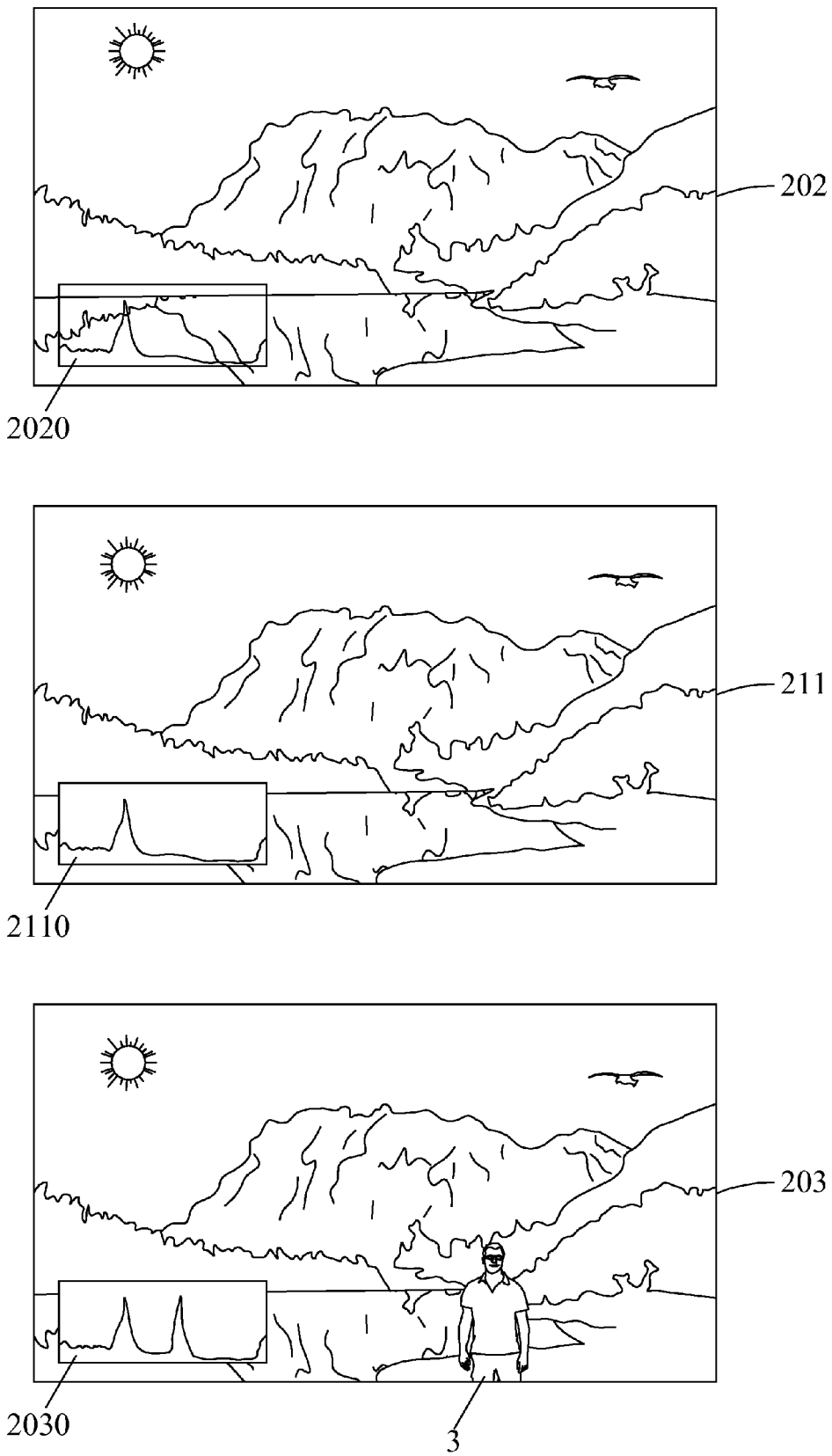
FIG. 3 is a schematic view of an image capturing apparatus in accordance with a second preferred embodiment of the present invention.

With reference to FIG. 3 for a schematic view of an image capturing apparatus in accordance with a second preferred embodiment of the present invention, the image capturing module 10 captures three consecutive temporal images, and the processing module 12 or a user selects one of the temporal images as a base image 211, and thus the remaining two temporal images can be provided for analyzing and comparing the contents of the temporal images 202, 203 with the base image 211 by a histogram. In FIG. 3, the image content of the temporal image 203 has a big difference from the base image 211, since a pedestrian 3 enters into the image capturing range of the image capturing module 10 when the user is taking the photo. Therefore, the color histogram 2030 of the temporal image 203 is substantially equal to the histogram 2110 of the base image 211, indicating that the image contents are different. At this time, the processing module 12 determines that the difference between the image content of the temporal image 203 and the image content of the base image 210 is relatively large and thus the temporal image 203 and the base image 210 are inapplicable for the following image combination procedure, and thus the processing module 12 deletes the temporal image 203 in the storage module 11, and performs an image combination of the remaining temporal images 202 with the base image 211.

However, those ordinarily skilled in the art should be able to understand and determine that the methods for determining the difference between each temporal image and the base image are not limited to one of the aforementioned two methods only. Of course, these two methods are used for the purpose of illustrating the present invention only, and any other equivalent method can be used in the present invention.

After the processing module 12 performs an image combination of the temporal images with the base image to generate an output image, some of the temporal images are deleted, so that the brightness of the output image may be insufficient. In other words, the output image of this preferred embodiment originally has a brightness of three temporal images, but one of the temporal images is deleted, so that the output image may only have ⅔ of the brightness after image combination. To overcome this problem, the processing module 12 increases the brightness of the output image by a digital gain method to achieve the original brightness predetermined by users. In addition, the processing module 12 also can use a temporal interpolation to find the brightness value of the base image and the undeleted temporal images, and then correct the brightness of the output image according to the aforementioned brightness value. However, the people ordinarily skilled in the art should understand that the method of correcting the brightness of the output image is not limited to the two foregoing two methods only, but any other equivalent method can be used in this invention.

In certain conditions, the quality of all temporal images except the base image captured by the image capturing module 10 is poor, and these temporal images will be deleted. Now, the processing module 12 will increase the brightness of the base image 21 (by a digital gain method), and beautify the base image to generate and output an output image.

Figure 4:
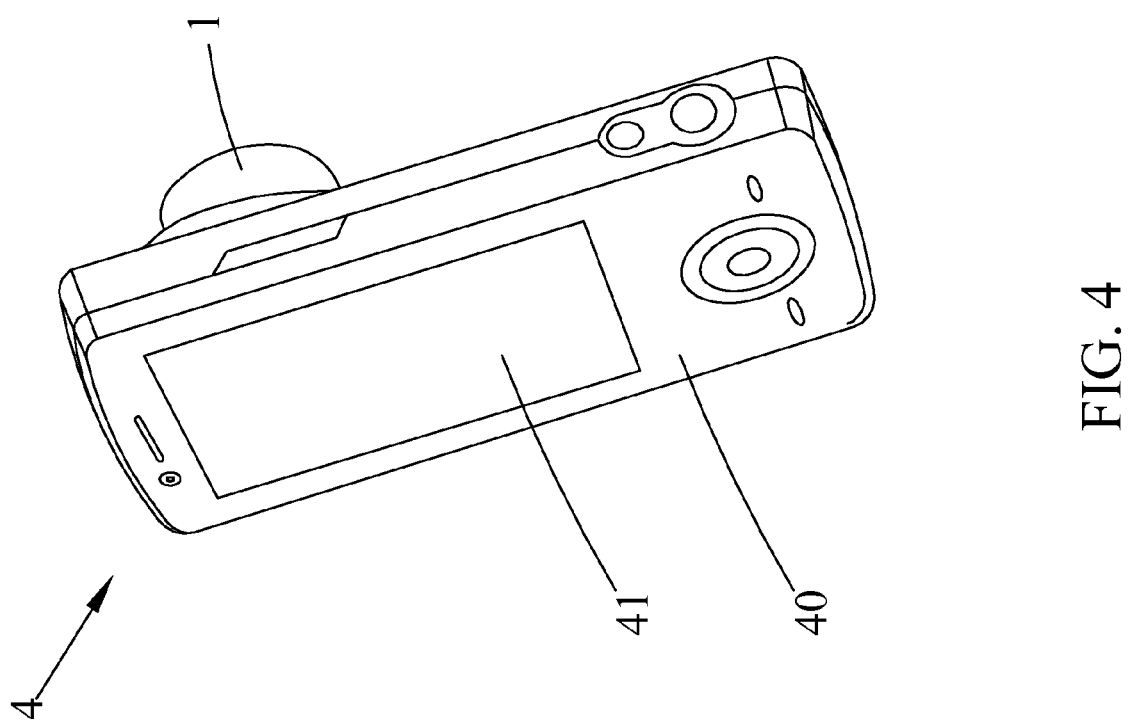
FIG. 4 is a schematic view of an electronic apparatus a preferred embodiment of the present invention.

With reference to FIG. 4 for a schematic view of an electronic apparatus of a preferred embodiment of the present invention, the electronic apparatus 4 comprises a main body 40, an input device 41, and an image capturing apparatus 1, wherein the image capturing apparatus 1 is installed onto the main body 40 and electrically coupled to the input device 41. The image capturing apparatus 1 comprises an image capturing module, a storage module and a processing module, and the image capturing apparatus 1 is the same as that described above, and thus will not be described here again. However, it is noteworthy to point out that the electronic apparatus 4 of the present invention could be a mobile handheld device such as a digital camera, a multimedia player with a photographic function, a mobile phone with a photographic function, a smart phone, a navigator, a tablet personal computer with a photographic function, or a personal digital assistant (PDA) with a photographic function.

In this preferred embodiment, the electronic apparatus 4 of the present invention is a smart phone embedded into the image capturing apparatus 1 for taking photos, so that a user can use the input device 41 such as a touch screen or a press key of the smart phone to take a picture. When it is necessary to take a picture, the electronic apparatus 4 starts the aforementioned continuous shooting and filtering actions to improve the anti-handvibration effect to enhance the clarity of the output image. The smart phone of this preferred embodiment is used for illustrating the present invention, but not intended for limiting the scope of the present invention, and those ordinarily skilled in the art can replace the image capturing apparatus of the invention by any other equivalent image apparatus.

The concept of the image capturing method of the present invention will become apparent with the illustration with the following flow charts.

Figure 5:
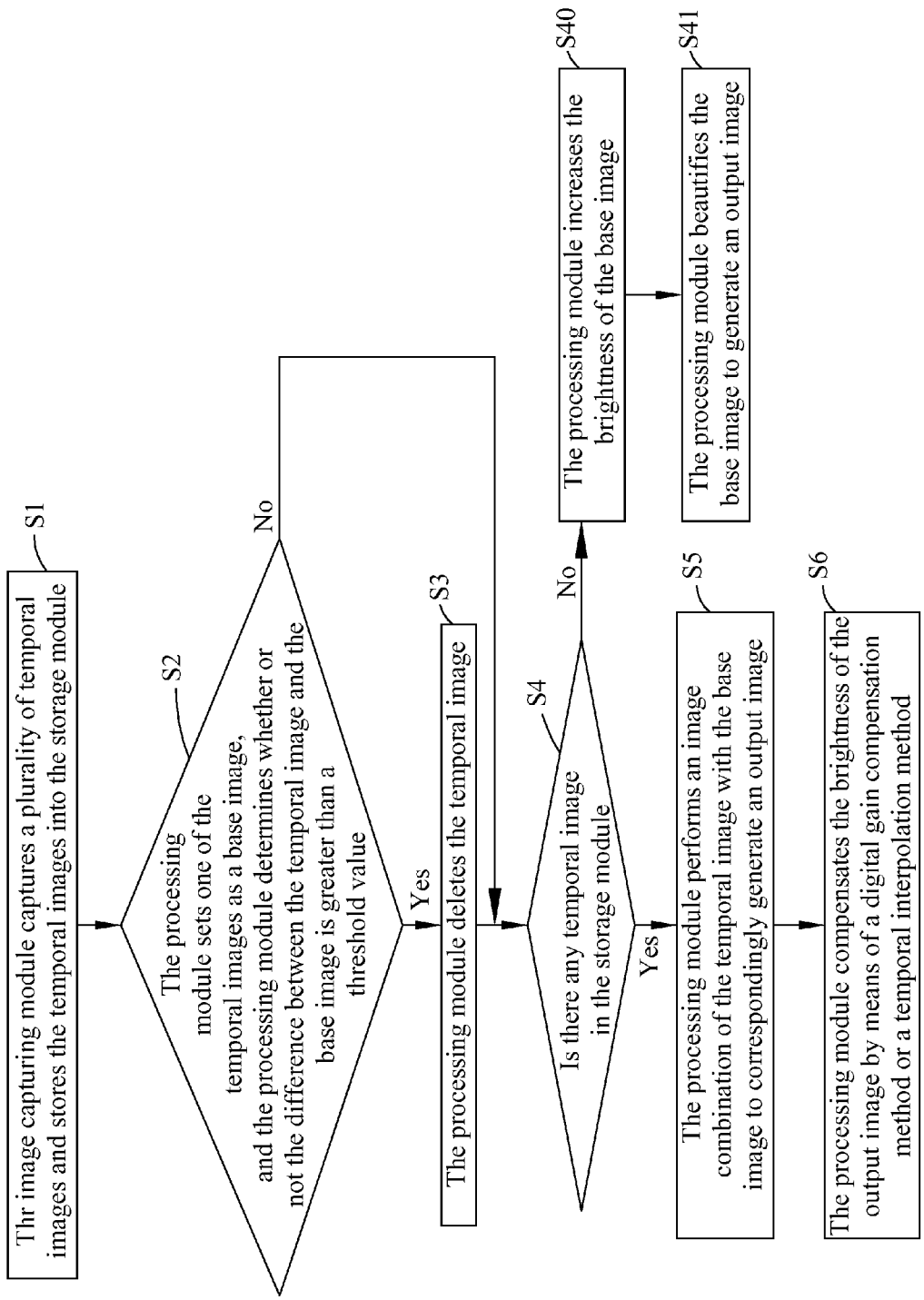
FIG. 5 is a flow chart of an image capturing method of the present invention.

With reference to FIG. 5 for a flow chart of an image capturing method of the present invention, the image capturing method is applicable for an image capturing apparatus, and the image capturing apparatus comprises an image capturing module, a storage module and a processing module, and the image capturing method comprises the following steps:

(S1) The image capturing module captures a plurality of temporal images and stores the temporal images into the storage module.

(S2) The processing module sets one of the temporal images as a base image and then determines whether or not the difference between the temporal image and the base image is greater than a threshold value.

(S3) If the difference between one of the temporal images and the base image is greater than the threshold value, the processing module will delete the temporal image.

(S4) The processing module determines whether or not there is still a temporal image in the storage module.

(S5) If there is a temporal image in the storage module, the processing module will perform an image combination of the remaining temporal images with the base image to correspondingly generate an output image.

(S6) Finally, the processing module compensates the brightness of the output image by a digital gain or a temporal interpolation.

In the step (S4), the processing module determines that there is no more temporal image in the storage module and then enters into the following procedure:

(S40) The processing module increases the brightness of the base image; and (S41) The processing module beautifies the base image to generate the output image.

Figure 6:
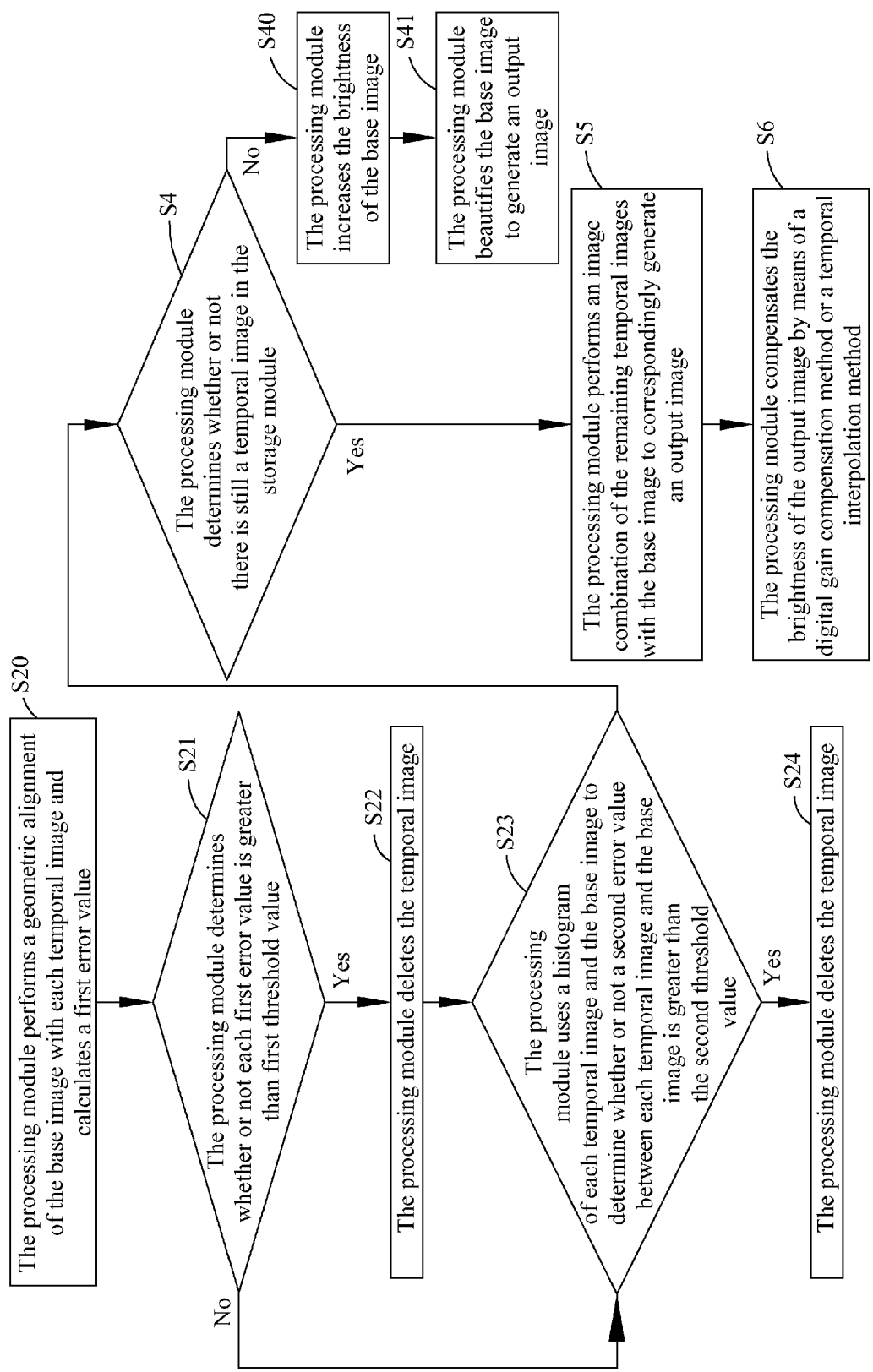
FIG. 6 is another flow chart of an image capturing method of the present invention.

With reference to FIG. 6 for another flow chart of an image capturing method of the present invention, the Step (S2) further comprises the following steps:

(S20) The processing module performs a geometric alignment of the base image block with each temporal image block and calculates a first error value;

(S21) The processing module determines whether or not each first error value is greater than a first threshold value;

(S22) The processing module deletes this temporal image if the first error value is greater than the first threshold value;

(S23) The processing module uses a histogram of the base image and each temporal image to determine whether or not a second error value of each temporal image and the base image is greater than a second threshold value;

(S24) The processing module deletes the temporal image, if the second error value is greater than second threshold value.

If the second error value in the step (S23) is not greater than a second threshold value, then the step (S4) will be executed. After the step (24) is executed, the step (S4) and the following steps are then executed.

The image capturing method of the present invention and its implementation have been described in the image capturing apparatus of the present invention already, and thus will not be described again here.

In summation of the description above, the electronic apparatus, the image capturing apparatus and the method thereof geometrically align the plurality of temporal images, and selects any temporal image with a poor quality according to the alignment error, in order to improve the clarity of the output image after the image combination is performed. In addition, the present invention can analyze the histogram of each block in each temporal image, and any temporal image with a poor quality can be filtered and selected according to the error values, and thus the present invention can effectively overcome the problem of outputting poor images caused by the image combination of the prior art.

What is claimed is:

1. An image capturing apparatus, comprising:
   an image capturing module, capable of capturing a plurality of temporal images; and
   a processing module, capable of setting one of the temporal images as a base image, and determining whether or not a difference between the remaining temporal images and the base image is greater than a threshold value;
   wherein if the difference between one of the remaining temporal images and the base image is greater than the threshold value, the processing module deletes the temporal image of the remaining temporal images, and performs an image combination to the rest of the remaining temporal images with the base image to correspondingly generate an output image, wherein the threshold value comprises a first threshold value and a second threshold value,
   wherein the processing module performs a geometric alignment of the base image with each of the remaining temporal images and correspondingly calculates a first error value, such that the processing module deletes the temporal image of the remaining temporal images if the first error value is greater than the first threshold value,
   wherein the processing module uses a histogram of the base image and each of the remaining temporal images to determine whether or not a second error value between the temporal image of the remaining temporal images and the base image is greater than the second threshold value, such that the processing module deletes the temporal image of the remaining temporal images if the second error value is greater than the second threshold value.

2. The image capturing apparatus of claim 1, wherein the processing module compensates the brightness of the output image by a digital gain or a temporal interpolation after the image combination is executed.

3. An electronic apparatus, comprising:
   a main body; and
   an image capturing apparatus of claim 1, and the image capturing apparatus being installed in the main body.

4. The electronic apparatus of claim 3, being a digital camera, a mobile phone with a photographic function, a personal digital assistant (PDA) with a photographic function, or a tablet personal computer with a photographic function.

5. The electronic apparatus of claim 3, wherein the processing module compensates the brightness of the output image by a digital gain or a temporal interpolation after the image combination is executed.

6. An image capturing method, comprising the steps of:
   capturing a plurality of temporal images by an image capturing module;
   setting one of the temporal images as a base image by a processing module;
   determining whether or not the difference between the remaining temporal images and the base image is greater than a threshold value by the processing module, wherein the threshold value comprises a first threshold value and a second threshold value;
   deleting one of the remaining temporal images by the processing module, if the difference between the temporal image of the remaining temporal images and the base image is greater than the threshold value; and
   performing an image combination of the rest of the remaining temporal images with the base image to correspondingly generate an output image by the processing module,
   wherein a geometric alignment of the base image with each of the remaining temporal images is performed to correspondingly calculate a first error value by the processing module for determining whether or not each first error value is greater than the first threshold value by the processing module and the temporal image of the remaining temporal images is deleted by the processing module if the first error value is greater than the first threshold value,
   wherein a histogram of the base image and each of the remaining temporal images is used to determine whether or not a second error value between the temporal image of the remaining temporal images and the base image is greater than the second threshold value by the processing module and the temporal image of the remaining temporal image is deleted by the processing module if the second error value is greater than the second threshold value.

7. The image capturing method of claim 6, further comprising the steps of:
   compensating the brightness of the output image by a digital gain or a temporal interpolation after the processing module performs the image combination.

8. The image capturing method of claim 6, further comprising the steps of:
   increasing the brightness of the base image by the processing module, if all of the remaining temporal images is deleted; and
   beautifying the base image to generate the output image by the processing module.

* * * * *